Patented Nov. 18, 1947

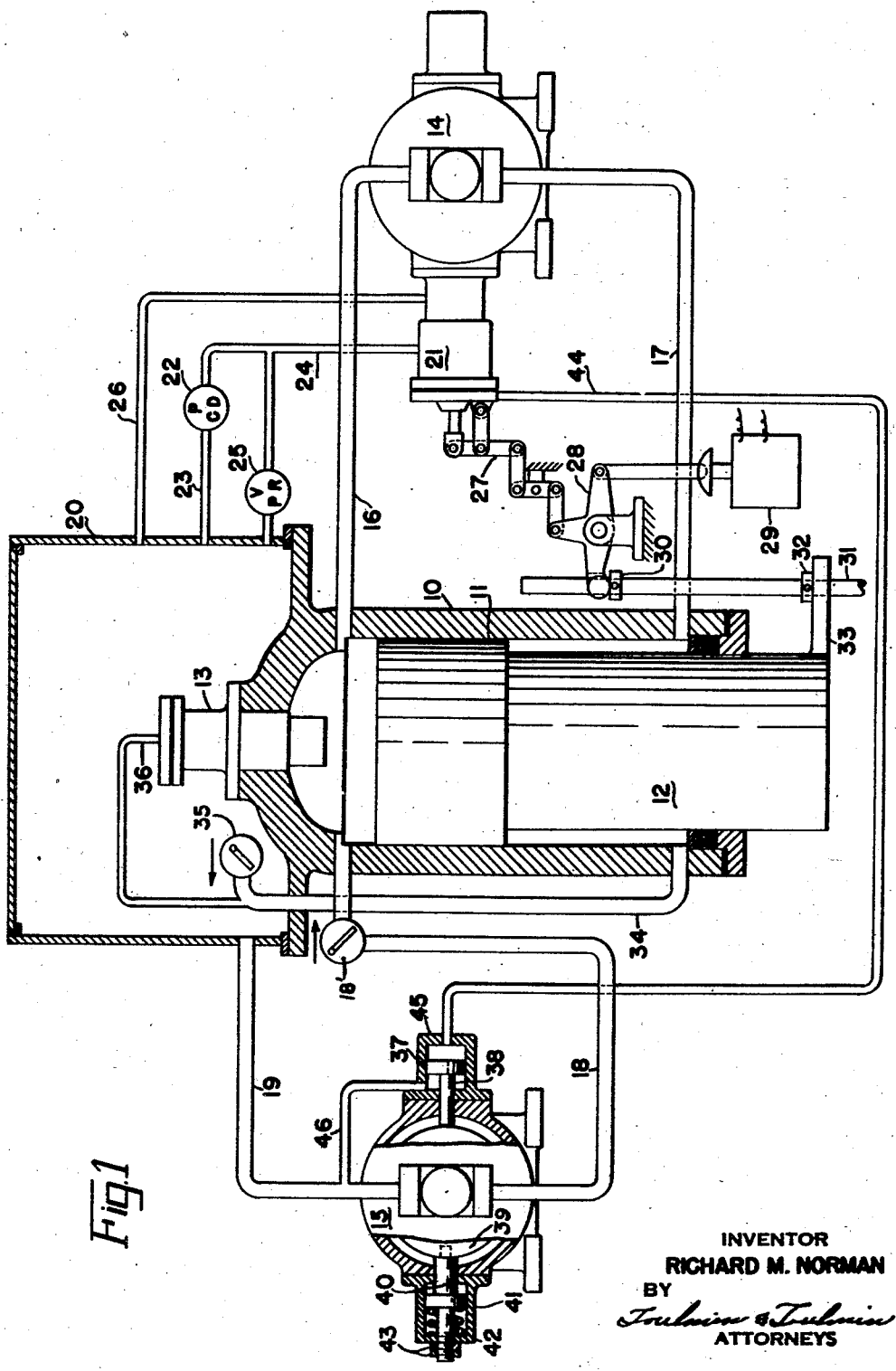

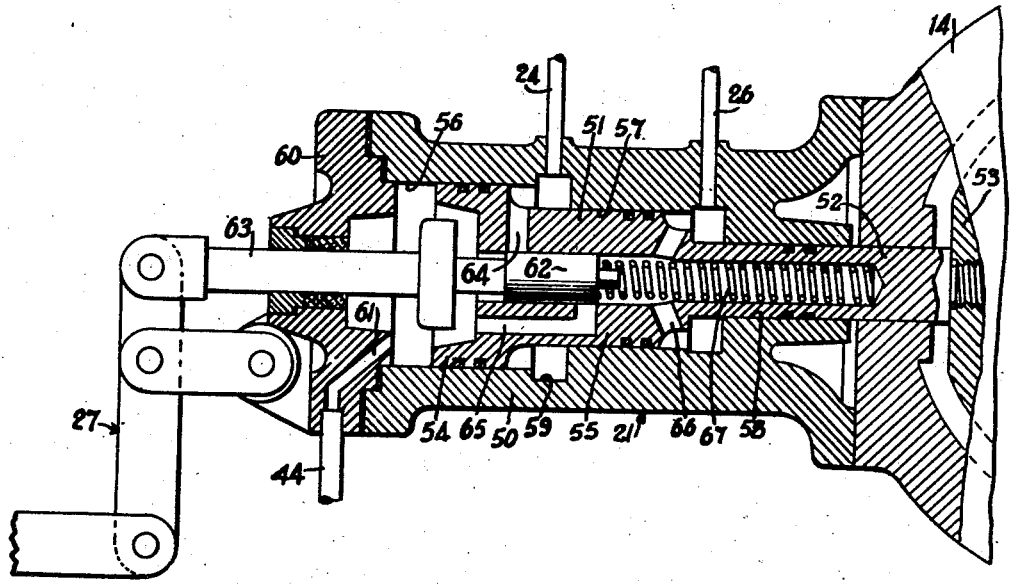
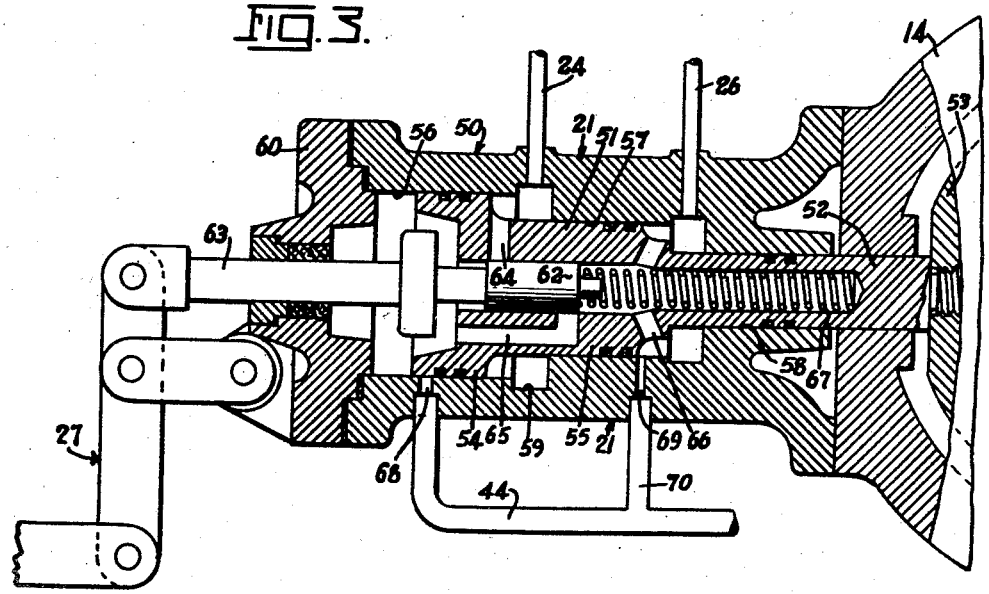

2,431,071

UNITED STATES PATENT OFFICE 2,431,071

SPECIAL PUMP CONTROL AND CONTROL SYSTEM

Richard M. Norman, Mount Gilead, Ohio, assignor to H-P-M Development Corporation, Wilmington, Del., a corporation of Delaware Application February 7, 1944, Serial No. 521,387

11 Claims. (Cl. 103—38)

This invention relates, generally, to fluid operable systems and, more specifically, to a system for controlling the output from a source of pressure fluid.

In many instances, in hydraulics, it is desired to effect high speed operation of a hydraulic motor or similar apparatus. In order to accomplish this result, a source of pressure fluid is required, the output of which is sufficient to drive the driven apparatus at the required speed. A particular instance requiring high speed of operation is a forging press. These presses are advanced to and into the work at the maximum possible speed both in order to move the metal into the desired shape, and also in order to accomplish the work in the shortest possible time while the work piece is still hot.

Heretofore, it has been customary to provide an accumulator system for powering such a press. The objection to accumulator systems is, that bulky, expensive auxiliary equipment is required. It is not possible on a large press to supply pressure fluid except by means of an accumulator because of the impracticability of building a pump of the necessary size.

However, a forging press powered by a pump would have definite advantages over a similar press powered by an accumulator system. Among the advantages to be gained are, smaller space requirements, less expensive equipment and greater ease of control.

Accordingly, it is a primary object of this invention to provide a fluid source of greater capacity and means for controlling the discharge of fluid from the source, the source comprising a plurality of variable delivery pumps. This and other objects will become apparent upon reference to the drawings taken in connection with the detailed description.

In the drawings:

Figure 1 is a diagrammatic view of a hydraulic press having a source of pressure fluid arranged and controlled according to this invention.

Figure 2 is an enlarged, sectional view through the servomotor of the main pump of Figure 1 and, Figure 3 is a similar view illustrating a modification.

General arrangement

According to this invention, a piece of hydraulic apparatus, for example, a press, is hydraulically connected with a pump or pressure generator in order to be driven thereby. Further to augment the operating speed of the press a second source of pressure fluid is provided and is hydraulically connected to deliver fluid simultaneously with the first or main pump.

The main pump is preferably of the reversible variable delivery type, and is controlled by a fluid operable servomotor. The second pump is preferably a one-way variable delivery pump and is likewise controlled by a fluid operable servomotor.

The second pump or pumps, is caused to be ancillary to the first by means of suitable hydraulic connections extending between their respective servomotors. In this manner, it is possible to control the main pump by means of standard or customary controls and to cause the subsidiary pumps to operate in conjunction with the main pump, automatically.

The standard control system for the main pump comprises means for moving the pump to full stroke forward position, means for moving the pump to full stroke reverse position, and means associated with the driven hydraulic motor for moving the main pump to neutral at the end of the retraction stroke.

Detailed description

Referring now to Figure 1, there is shown a hydraulic motor comprising a cylinder 10 having reciprocably mounted therein a piston 11 and attached plunger 12. The plunger 12 may terminate, exteriorly of the cylinder 10 in a platen or any other suitable manner.

Fitted in the top of the cylinder 10 is a surge valve 13, the purpose of which is to fill the space above the piston 11 during the rapid downward travel of the press ram and piston, and freely to exhaust the same space during the retraction stroke of the press ram and piston.

Pressure fluid is supplied to the cylinder 10 by means of pumps 14 and 15. A conduit 16 leads from the upper end of the cylinder 10 to one side of the pump 14, and a conduit 17 connects the other side of the pump 14 with the lower end of the cylinder 10. A conduit 18 connects the discharge side of the pump 15 with the main cylinder 10 and includes a check valve 18' adapted freely to pass fluid from the pump 15 to the main cylinder 10 but to prevent fluid flow in the opposite direction. A conduit 19 connects a suction side of the pump 15 with a surge tank 20, which may be located as desired, say, on the top of the cylinder 10.

According to this invention, the pump 14 is preferably, a reversible, variable delivery pump while the pump 15 is preferably a one-way, variable delivery pump.

The pump 14 is provided with a fluid operable servomotor generally indicated at 21, and a source of pilot pressure for operating the same indicated at 22. The pilot pump, or auxiliary fluid source is adapted to draw fluid from the surge tank 20 through a conduit 23 and to discharge the same, at increased pressure, to the servomotor 21 through a conduit 24. A pressure relief valve at 25 is suitably hydraulically connected, between the conduit 24 and the surge tank 20, to discharge the excess delivery of the pump 22 when the full delivery of the said pump is not required by the servomotor 21. An exhaust conduit 26 leads from the servomotor 21 to the surge tank 20 and serves to exhaust fluid from the servomotor during the operation thereof.

Suitable linkage, indicated at 27, interconnects the servomotor 21 of the pump 14 with one arm of a three armed lever 28.

A second arm of the lever 28 is connected to a solenoid 29, and a third arm is adapted to be engaged by a collar 30 on a control rod 31. Energization of the solenoid 29 is effective, through the linkage 27, to cause the servomotor 21 to place the pump on full delivery forward position. The collar 30 and the control rod 31 are effective, in cooperation with the collar 32 and the platen arm 33, and in connection with the linkage 27, to cause the servomotor 21 to shift the pump 14 from full stroke reverse position to neutral position at the end of the retraction stroke.

A conduit 34 leads from the lower end of the cylinder 10 through a check valve 35 to the tank 20. This connection is for the purpose of supplying makeup fluid to the pump during the pressing stroke in a manner which will become more apparent hereinafter. A conduit 36 interconnects the conduit 34 with the operating cylinder of the surge valve 13 and serves to conduct pressure fluid thereto to maintain the same in an open condition during the retraction stroke of the press ram and piston.

The aforementioned servomotor, control linkage, pilot pump and surge valve are illustrated in United States Patent No. 2,184,665 to Walter Ernst, this patent and the present application having a common assignee.

The pump 15 is provided with a fluid operable piston 37 which abuts, by means of a plunger 38, a shift ring or other flow control member within the pump casing. Attached to the flow control member, on the opposite side from the plunger 38, is a shouldered rod 40. The rod 40 extends into a spring chamber 41, attached to the pump casing, and is therein engaged by the spring 42. A reduced diameter portion of the rod extends rightwardly through the end wall of the spring chamber 41 and is threaded to receive the adjusting nuts 43. The spring 42 serves to continuously urge the flow control member of the pump 15 to substantially neutral or no delivery position, while the nuts 43 are effective to provide a precise adjustment of this position.

A conduit 44 connects between the servomotor 21, of the pump 14, and the cylinder 45 within which the piston 37 is reciprocable. A conduit 46 connects between the right hand end of the cylinder 45 and the suction line 19, of the pump 15, and thereby serves to relieve any pressure created within the right end of the cylinder 45 by the movement of the piston 37.

Referring now to Figure 2, the construction of the servomotor 21 is more clearly shown. The servomotor comprises a cylinder 50 attached to the casing of the pump 14, and having reciprocably mounted therein a double acting piston 51. The piston 51 is connected, by means of a plunger 52, with the shift ring 53 of the pump 14. The piston 51 comprises an enlarged diameter portion 54 and a smaller diameter portion 55. The cylinder 50 is bored as at 56 to accommodate the portion 54 of the piston 51 and, as at 57, to accommodate the portion 55. A third bore, indicated at 58 accommodates the plunger 52.

The conduit 24 communicates with the interior of the cylinder 50 at a groove 59 at the junction point of the bores 56 and 57. The exhaust conduit 26 communicates with the interior of the cylinder 50 at the right hand end of the bore 57, where the latter joins the bore 58. The left hand end of the cylinder 50 is closed by a closure plate 60 which is centrally apertured for a purpose which will become hereinafter apparent. The conduit 44 communicates with the interior of the cylinder 50 by means of a passage 61 in the closure member 60. The conduit 44 is thus continuously in communication with the space defined by the bore 56, the closure plate 60 and the piston portion 54.

The piston 51 is centrally and axially bored to receive a piston 62, which piston is connected, by means of the plunger 63, with the linkage 27. A radial bore 64, in the piston 55, is effective to communicate between the right hand end of the bore 56 and the central bore of the servomotor piston 51. A second passage in the piston 55 is indicated at 65 and serves to communicate between the said axial bore in the piston 55 and the left hand end of the bore 56. The ends of the bores 64 and 65, which open into the axial bore within the piston 51, are so spaced that the piston 62 substantially covers both of them at one time.

The central axial bore within the piston 55 is further communicated, by means of the passages 66, with the right hand end of the bore 57 and, thereby, also with the exhaust conduit 26. Pressure fluid for actuating the servomotor is delivered to the interior of the cylinder 50 by the conduit 24, and exhaust fluid from the servomotor escapes therefrom to the surge tank by means of the conduit 26. The flow of fluid to and from the servomotor is regulated by the piston 62.

The piston 62 is adapted to be moved to the right by the rod 63, and to the left by means of a spring 67.

Referring now to Figure 3, the servomotor construction shown therein is identical with that shown in Figure 2, but the location of the point of communication between the conduit 44 and the interior of the cylinder 50 is different. In Figure 3, conduit 44 communicates with the interior of the cylinder 50 at points marked 68 and 69. The point marked 68 is so located that, when the piston 55 is in its neutral position, the fluid connection between the port 68 and the interior of the cylinder 50 is cut off. With the piston 51 in this position, the point 69 is in communication with the right hand, or exhaust end of the bore 57. The ports 68 and 69 are further so arranged that when the piston 55 is moved to the right towards on stroke position, the port 69 is completely covered before the port 68 is uncovered.

*Operation*

Assume that the press is standing idle in its retracted position as indicated in Figure 1. The platen arm 33 is engaged with the collar 32 on the rod 31, thereby lifting the latter. The collar 30, being lifted by the rod 31 into engagement with one arm of the three armed lever 28, has shifted the linkage 27 until the servomotor 21 occupies the position shown in Figure 2, that is, neutral. At this time, pump 15 is also on neutral, as shown in Figure 1.

A working stroke is instituted by the energization, by any suitable means, of the solenoid 29. Energization of the solenoid 29 causes a clockwise rotation of the three armed lever 28, a shifting of linkage 27 and a movement rightwardly of the rod 63 and piston 62. The movement of the piston 62 to the right is effective to uncover the inner end of the passage means 64 thereby to permit pressure fluid from the pilot pump 22 to enter, by means of conduit 24, the space within the bore 56 and to the left of the piston portion 54. The left hand area of piston 54 is larger than the right hand area and, therefore, due to the presence of pressure on the left hand area, the servomotor piston 51 moves to the right. The rightward movement of the piston 51 will continue until the passage means 64 is again covered by the piston 62. Normally, the movement to the right of the pistons 62 and 51 is sufficient to place the pump in full stroke forward position.

When the piston 62 is moved to the right and pressure fluid is introduced into the left end of the bore 56, pressure fluid also passes through the bore 61 and into the conduit 44 by which means it is conducted to the cylinder 45 of the pump 15. The introduction of pressure fluid into the right end of the cylinder 45 is effective to urge the piston 37 to the left, thereby, by means of the plunger 38, to move the shift ring 39 to forward stroke position against the thrust of the spring 42. Both pumps are now delivering into the main cylinder 10, the main pump 14, through the conduit 16, and the secondary pump 15 through the conduit 18.

The press ram and piston descend to work engaging position at a rate which is determined by the rate which the pump 14 withdraws fluid from the lower end of the cylinder 10. During this period of rapid advance, fluid to fill the upper end of the cylinder 10, in excess of that delivered by the pumps 14 and 15 is supplied via the surge valve 13. The surge valve 13 remains open until the plunger 12 reaches work engaging position.

When the plunger 12 has engaged the work, the surge valve 13 closes and pressure builds up in the upper end of the cylinder 10. The plunger 12 advances into the work at a rate which is determined by the combined outputs of the pumps 14 and 15. The work is thus accomplished at a high rate of speed and under whatever pressure is required for the accomplishment thereof.

The press may be reversed by deenergizing the solenoid 29 by any well known means, such as a pressure operated switch, a position operated switch or by manual means. Upon deenergization of the solenoid 29 the spring 67 is effective to move the piston 62 to the left relative to the servomotor piston 51. The leftward movement of the piston 62 uncovers the inner end of the passage 65 and thereby exhausts the left end of the bore 56. Since pressure continually stands on the right hand side of piston 54, the servomotor piston 51 will move to the left when the left hand end of the bore 56 is exhausted. The exhausting of the left hand end of the bore 56 likewise permits the spring 42, of the pump 15, to move the shift ring 39, the plunger 38 and the piston 37 to the right, exhausting fluid from the cylinder 45 through the conduit 44, the passage 61, the passage 65, bores 66 and conduit 26 to the tank. Upon reversal of the pump 14, therefore, the pump 15 moves to neutral or no delivery position.

Referring now to Figure 3, an arrangement is shown whereby it is insured that the cylinder 45 will be exhausted when the pump 14 is placed on reverse stroke, or moved into neutral or no delivery position. This is accomplished by means of the branch conduit 70 which interconnects the conduit 44 with the port 69, the port 69 being connected with the exhaust conduit 26 during the time that the pump 14 is on neutral or reverse stroke. By covering the port 69, and subsequently uncovering the port 68, the pump 15 is caused to go on forward stroke simultaneously with the pump 14, and to be in neutral whenever the pump 14 is shifted from forward stroke to neutral.

It will be apparent that the control system of this invention is not limited to the control of a single ancillary pump but may be extended to as many pumps as it is desired to control, the limiting factor being the size of the pilot pump 22. It will also be apparent that modifications are possible within the scope of the invention as hereinafter defined.

For example, the surge valve may be eliminated from the cylinder if the pump capacity be so proportioned between the reversible pump and the one-way pump that the proper amount of fluid is supplied and withdrawn from the motor cylinder as the plunger reciprocates therein.

Accordingly, it will be understood that I do not wish to be limited to the particular arrangements shown and described.

I claim:

1. In a hydraulic system, a fluid source comprising a first pump of the reversible variable delivery type having a first and a second port, a second pump of the one way variable delivery type having an inlet port and an outlet port, means hydraulically connecting said outlet port with said second port, means associated with said first pump for continuously urging the same into position to deliver to said first port, fluid operable means associated with said first pump and operable to move the same into position for delivering to said second port, yielding means associated with said second pump for continuously urging the same into no delivery position, fluid operable means associated with said second pump for moving the same into delivery position, conduit means hydraulically connecting said fluid operable means, and valve means selectively operable for supplying actuating fluid to said fluid operable means whereby to cause said pumps to deliver in unison.

2. In a hydraulic system having an inlet side and an outlet side, a reversible variable delivery pump connected with said inlet side and said outlet side, a one-way variable delivery pump having its outlet connected with said inlet side, means continuously urging said reversible pump into position to deliver fluid to said outlet side, a fluid operable plunger associated with said reversible pump and operable in response to a predetermined pressure thereon to position said reversible pump to deliver fluid to said inlet side, yielding means associated with said one-way delivery pump for urging the same toward no delivery position, a fluid operable plunger associated with said one-way delivery pump and operable in response to a predetermined pressure thereon for positioning said one-way pump to deliver fluid to said inlet side, a source of pressure fluid for supplying actuating fluid to said plungers, valve means selectively operable for controlling the supply of actuating fluid from said source to said plungers, and conduit means hydraulically connecting said source with said valve and said valve with said plungers.

3. In a hydraulic system; a first variable delivery pump having a double acting piston associated therewith which is selectively movable into a neutral position to prevent the delivery of said first pump, or in a first direction from neutral to direct the delivery of said first pump into a first conduit, or in a second direction from neutral to direct the delivery of said first pump into a second conduit; a second variable delivery pump connected in parallel with said first pump and having yielding means associated therewith for continuously urging the same into no delivery position, a fluid operable plunger associated with said second pump and operable to position the same against the thrust of said yielding means to deliver into said first conduit; means responsive to a predetermined movement of said double acting piston in said first direction from neutral to admit actuating fluid to said fluid operable plunger, and means responsive to the movement of said double acting plunger into neutral for exhausting said fluid operable plunger.

4. In a hydraulic system; a first variable delivery pump having a double acting piston associated therewith which is selectively movable into a neutral position to prevent the delivery of said first pump, or in a first direction from neutral to direct the delivery of said first pump into a first conduit or in a second direction from neutral to direct the delivery of said first pump into a second conduit; a second variable delivery pump connected in parallel with said first pump and having yielding means associated therewith for continuously urging the same into no delivery position, a fluid operable plunger associated with said second pump and operable to position the same to deliver into said first conduit; valve means selectively operable to direct actuating fluid to one side or the other of said double acting plunger, and conduit means adapted in response to a predetermined movement of said double acting plunger in said first direction for admitting actuating fluid to said fluid operable plunger whereby said pumps deliver in unison into said first conduit.

5. In a hydraulic system; a first variable delivery pump having a servomotor which includes a cylinder within which is reciprocable a double acting plunger movable from a neutral position in a first direction to bring about the delivery of said first pump in a first direction or in a second direction from neutral to bring about the delivery of said pump in a second direction; a second variable delivery pump connected in parallel with said first pump and having a servomotor which includes yielding means continuously urging said second pump into neutral and a fluid operable plunger adapted for positioning said second pump to deliver in said first direction; valve means selectively operable for directing fluid to one side or the other of said double acting plunger; and conduit means connected with said fluid operable plunger and with said cylinder and responsive to a predetermined movement of said double acting plunger in said first direction for admitting actuating fluid to said fluid operable plunger and also operable when said double acting plunger is in neutral to exhaust said fluid operable plunger.

6. In a hydraulic system; a first variable delivery pump having a double acting plunger operable selectively to position said pump in neutral or in position to deliver in a first or in a second direction, valve means connected with said plunger operable to direct pressure fluid to one side or to the other of said double acting plunger, yielding means continuously urging said valve means in one direction; a second variable delivery pump connected in parallel with said first pump and having yielding means and a fluid operable plunger operable for positioning said pump in neutral or in position to deliver in said first direction respectively; means operable to exhaust said fluid operable plunger when said double acting plunger is positioned in neutral or in position to cause said first pump to deliver in said second direction, and other means operable when said double acting plunger is positioned to bring about the delivery of said first pump in said first direction to interrupt said exhaust connection while permitting the supply of actuating fluid to said fluid operable plunger.

7. In a hydraulic system, a reversible variable delivery pump and a unidirectional variable delivery pump connected in parallel, a first fluid operable plunger associated with said reversible pump for positioning the same to deliver fluid in one direction, a second fluid operable plunger associated with the said unidirectional pump for positioning the same to deliver fluid in the said one direction, valve means selectively operable for controlling the supply of actuating fluid to said first fluid operable plunger, and means responsive to a predetermined movement of said first plunger by fluid pressure supplied thereto for hydraulically connecting said plungers, whereby said pumps deliver in unison in said one direction.

8. In a hydraulic system, a plurality of sources of pressure fluid connected in parallel, fluid operable means associated with each of said sources movable for controlling the delivery thereof, valve means selectively operable for controlling the supply of actuating fluid to one of said fluid operable means, and means operable in response to a predetermined movement of said one fluid operable means for hydraulically connecting all of said fluid operable means.

9. In a hydraulic system, a reversible pumping means and a one-way pumping means connected in parallel, first fluid operable means associated with said reversible pumping means for positioning the same to deliver fluid in one direction, second fluid operable means associated with said one-way pumping means for positioning the same to deliver fluid in the said one direction, valve means associated with said first fluid operable means for controlling the supply of actuating fluid thereto, and means responsive to the actuation of said first fluid operable means by the supply of fluid thereto from said valve means to bring about the supply of actuating fluid to said second fluid operable means.

10. In a hydraulic system, a reversible delivery pumping means and a one-way delivery pumping means connected in parallel, first and second fluid operable means associated with said reversible pumping means for selectively positioning the same to deliver fluid in one direction or the other respectively, third fluid operable means associated with said one-way pumping means for positioning the same to deliver fluid in said one direction, a source of pressure fluid, and valve means selectively operable for directing a supply of actuating fluid from said source to said first and third fluid operable means simultaneously or to said second fluid operable means alone.

11. In a hydraulic system, a reversible delivery pumping means and a one-way delivery pumping means connected in parallel, first and second fluid operable means associated with said reversible pumping means for selectively positioning the same to deliver fluid in one direction or the other respectively, third fluid operable means associated with said one-way pumping means for positioning the same to deliver fluid in said one direction, a source of pressure fluid, and valve means selectively operable for directing a supply of actuating fluid from said source to said first and third fluid operable means simultaneously, or to said second fluid operable means while exhausting said first and third fluid operable means.

RICHARD M. NORMAN.

REFERENCES CITED

The following references are of record in the file of this patent:

UNITED STATES PATENTS

| Number | Name | Date |
|---|---|---|
| 2,283,168 | Ernst | May 19, 1942 |
| 2,193,248 | Ernst | Mar. 12, 1940 |
| 2,299,686 | Ernst | Oct. 20, 1942 |
| 2,280,190 | Ernst | Apr. 21, 1942 |
| 2,038,272 | Ernst | Apr. 21, 1936 |